United States Patent [19]
Melville

[11] Patent Number: 5,359,781
[45] Date of Patent: Nov. 1, 1994

[54] SELF CENTERING PIPE AXIS LASER GUIDE AND SADDLE

[76] Inventor: Kenneth B. Melville, 9507 50th Pl., College Park, Md. 20740

[21] Appl. No.: 41,038

[22] Filed: Mar. 31, 1993

[51] Int. Cl.⁵ .......................................... G01B 11/27
[52] U.S. Cl. .................................. 33/286; 33/520; 33/529; 33/354; 33/373; 33/645; 33/DIG. 21
[58] Field of Search ............. 33/286, 299, DIG. 21, 33/520, 529, 544.2, 544.6, 302, 354, 372, 373, 644, 645, 542; 356/138

[56] References Cited

U.S. PATENT DOCUMENTS

| | | |
|---|---|---|
| 2,323,039 | 6/1943 | Hill . |
| 2,541,641 | 2/1951 | Dodson ................................ 33/373 |
| 3,631,601 | 1/1972 | McNulty . |
| 3,707,722 | 1/1973 | Cotter .................................. 33/373 |
| 3,742,581 | 7/1973 | Roodvoeis . |
| 4,053,238 | 10/1977 | George et al. .................. 356/138 x |
| 4,155,648 | 5/1979 | Ferguson ......................... 33/299 X |
| 4,357,660 | 11/1982 | Hepp ................................ 33/302 X |
| 4,521,968 | 6/1985 | Wiltermood et al. ............. 33/286 X |
| 4,711,037 | 12/1987 | Saadat .............................. 33/520 |

Primary Examiner—Alvin Wirthlin
Attorney, Agent, or Firm—Robert Halper

[57] ABSTRACT

A self centering guide pipe axis laser guide is based on the use of three parallel links spaced 120 degrees apart which are engaged to be expanded or contracted. When expanded the links contact the inside diameter of the pipe which accordingly establishes the center axis of the pipe. The driving means for the links is a rotating screw mounted in a base centrally located with respect to the three links. In the front of the base is a laser module whose beam is aligned with the center axis of the pipe once the links contact the inner diameter of the pipe. Gauges mounted in a saddle on top of the pipe determine the proper slope once the center axis has been established. A calibrated scale on the guide can be used for determining both inner and outer diameters of the pipe. While the laser guide has been illustrated in determining the center line of pipes, it also has other uses such as aligning pillow blocks to a center line.

10 Claims, 6 Drawing Sheets

SELF CENTERING PIPE AXIS LASER GUIDE AND SADDLE

FIELD OF INVENTION

This invention has to do with the location of a pipe axis, the projection of a laser beam on this axis for alignment purposes and the monitoring of the inclination of this axis as for example in the installation of piping systems or the alignment of pillow blocks for motor shaft bearings.

BACKGROUND OF THE INVENTION

In recent years the use of a laser beam for pipe installation has become quite prevalent. Most of the devices extant are used for larger pipe, that is, greater than six inch pipe diameter. Moreover, many of the devices, while providing means for positioning the laser beam to a specific grade and elevation do not necessarily establish the beam at the axis of the pipe. To establish the coincidence of the axis of the beam and the pipe, the general procedure is to shift the pipe to a position that is adjudged by the eye to be in alignment with the center. Obviously such trial and error procedure is not very accurate. U.S. Pat. No. 4,916,817 is an example of prior art which has a solution for the problem. The essence of this invention is to use what is referred to as a laser target anchored at one end of the pipe. In general a laser will be started at one end of a pipe and will emit a beam that travels through the pipe and strikes a target plate formed of a dielectric sufficiently translucent to allow the point at which the beam strikes the plate to be visible from the opposite end. The plate is provided with a series of cross hatch marks which indicate the center of the target and the pipe is adjusted until the beam strikes the laser target's center. There is also a level on the target plate that assists in identifying alignment errors. Note also other examples of diverse laser target systems for pipes cited in column 1 of this patent. Another type of prior art for laying pipe, U.S. Pat. No. 3,742,581 makes use of two projected planes of light through the pipe so that each plane is either coplanar or parallel to the selected axis. There are also a number of patents that utilize mechanical self centering devices such as U.S. Pat. Nos. 1,448,528, 2,447,932, 3,822,478, 4,069,688 and 4,173,164. Besides being structurally distinct from the present invention, none is concerned with the use of laser beams. U.S. Pat. No. 2,323,039 does bear a structural resemblance to the present invention, although this patent refers to his device as a clamp whose purpose is to weld flanges to pipes with the clamp holding the flange plate secure when his jaw members engage the inner diameter of the pipe. The driving means is a crank with a screw having oppositely arranged threads with followers connected to the jaws through links for driving the jaws in opposite directions as the screw is rotated.

Accordingly it is an object of this invention to provide a simple and inexpensive self centering laser guide for laying pipe.

Another object of the invention is to provide a mechanical self centering device that is readily adapted for pipe that is six inches diameter or less.

Still another object of this invention is to provide a pipe axis laser guide that is accurate and does not depend on mere observation to determine the pipe axis.

A further object of the invention is to adapt the self centering lasering guide for installing and aligning independent structures such as pillow blocks for the installation of shaft bearings.

An additional object of this invention is to mount a saddle assembly with an inclination gauge about the circumference of the pipe to measure pipe inclination.

SUMMARY OF THE INVENTION

The self centering laser guide of this invention is a mechanical device based on the principle that when three planar surfaces spaced 120 degrees apart intercept the walls of a cylinder the axis of the cylinder will be automatically determined. The saddle of this invention is a device based on the principle that a series of rectangular members tangent to a cylinder throughout their length are parallel to the cylinder axis.

The self centering pipe axis laser guide assembly comprises three expanding link mechanisms spaced 120 degrees apart having a common base whose center line represents the central longitudinal axis. The links are made up of parallel, radial, lever and axis links. A laser module attached to the base has its output aligned with this base axis. A lead screw is included in the base and is the drive mechanism for a spider lever and the lever links which rotate the radial links and offset the parallel link from the axis link. The relative position of the spider lever is used as an indication of pipe diameter against scales calibrated for both inside and outside diameters. A knob assembly possessing adjustable torque characteristics is connected to the lead screw and is rotated clockwise to expand the links or counterclockwise to retract the links. In either case rotation is continued until excessive torque disengages the lead screw. The pipe axis laser guide has the capability of locating the central axis in a variety of pipe diameters, although it is primarily used for diameters of two to seven inches. Generally the pipe axis laser guide is inserted into the front end of a pipe in the retracted position and expanded until the parallel link edges contact the inside diameter of the pipe. Slight pressure from the parallel links retain the unit in place with the centerline of the base in alignment with the axis of the pipe. Unlike most current laser systems that position the laser beam to specific grade and then manually position the pipe axis to the beam, the laser guide of this device inherently positions the laser beam to the pipe axis and then the pipe is positioned to a specific grade if required with the aid of the saddle and inclination gauge. The pipe axis laser guide in its fully retracted form also possesses the ability to allow the laser beam to project a reference line offset from a flat surface but parallel to that surface.

The saddle assembly is comprised of a series of evenly spaced rectangular struts on a flexible base that is strapped around the outside circumference of the pipe. The straps are adjusted until the rectangular struts are parallel to the pipe axis by positioning the struts tangent to the pipe surface as viewed on each end. A saddle plate is mounted to the center strut and is the reference surface for the inclination gauge. The saddle plate has scribe marks parallel to the central strut and the pipe axis. These marks are used to visibly align the inclination gauge. The inclination gauge may be a variety of presently available commercial products. A bubble vial is mounted to the saddle plate perpendicular to the center strut axis to aid in the positioning of the saddle plate vertically above the pipe axis and eliminating a roll error for proper inclination reading.

DETAILED DESCRIPTION OF THE INVENTION

Figure 1:
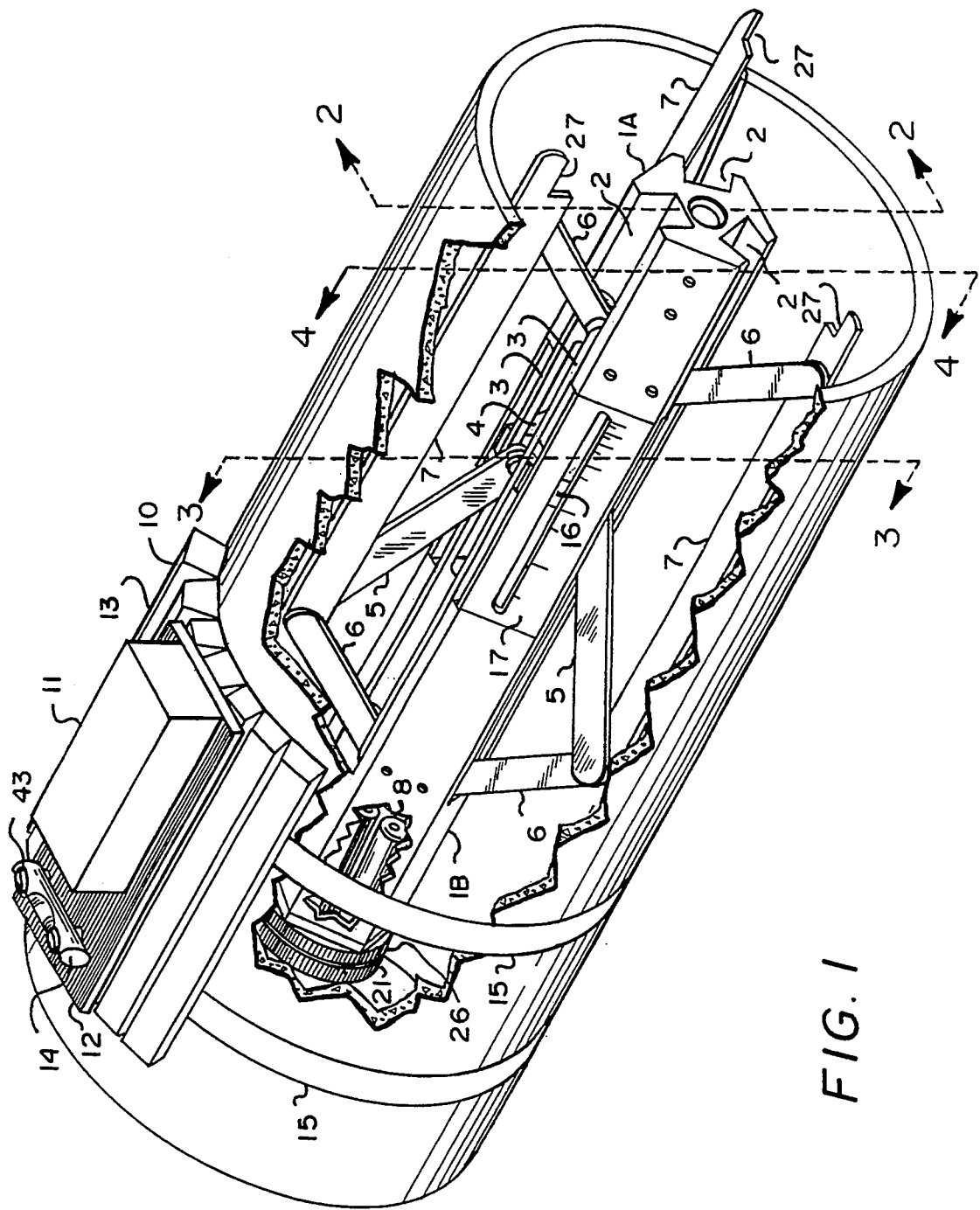
FIG. 1 is an isometric view of the pipe axis laser guide inserted into a section of pipe with the saddle and inclination gauge attached.
Figure 5:
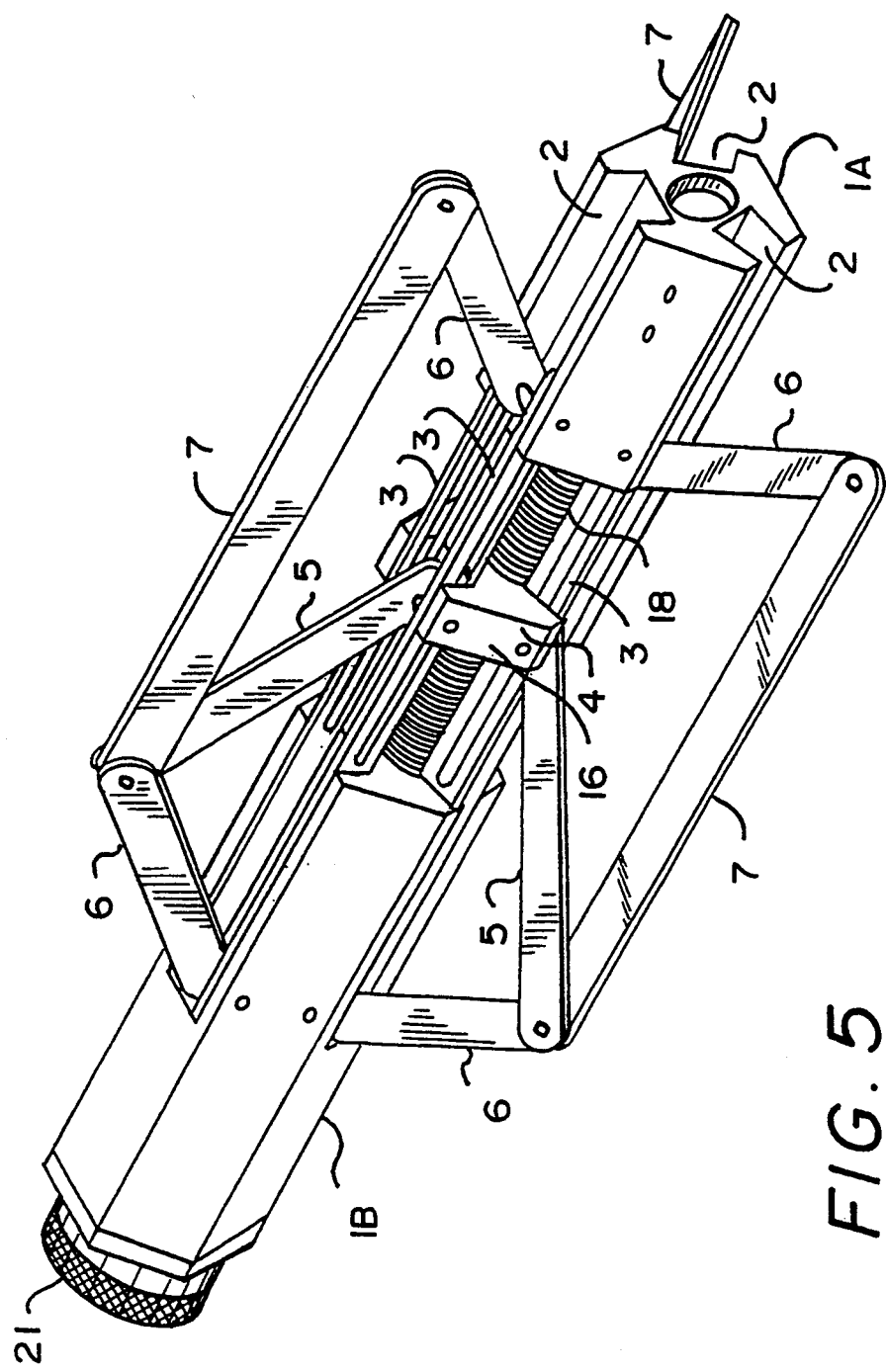
FIG. 5 is a isometric view of the pipe axis laser guide with the side panels removed displaying the lead screw and lever spider with scale pointer.

FIG. 1 shows the pipe axis laser guide installed in a section of pipe with the saddle and inclination gauge attached. The housing comprises a front end spider shaped element 1A and a rear end spider shaped element 1B. These elements are formed from hexagonal stock with three machined channels 2 spaced 120 degrees apart. The channels of the rear end spider element 1b are machined only partially along the axis leaving the hexagonal stock shape which is cored for the insertion of power cell batteries 8 as shown in the cut away section. The batteries connect to the laser module located in the front end spider shaped element and are preferably AA size Ni-Cad batteries. Adjacent the legs of each channel are a pair of axis links 3. Between the rear front and rear end spider elements is a spider lever 4. The spider lever is shaped similar to the rear end spider element but has a short length and a smaller cross section. (See FIG. 3) The axis links 3 are enclosed by the spider lever 4 and align the front and rear end spider elements 1a and 1b. A lever link 5 is connected between spider lever 4, rear radial link 6 and the rear of the parallel link 7. The front of the parallel link is connected to a front radial link 6. The other end of the front radial link is connected to the front end spider element 1a and the rear radial link is connected to the rear end spider element 1b. The position of the spider lever pointer 16 (better seen in FIG. 5) indicates on the side cover plate 17 the scales for the diameter of the pipe under test. The scale is calibrated for inside diameter or outside diameter readings or both. As seen in FIG'S. 2 and 4, the front end spider element contains a visible diode laser module 9 which is calibrated to the housing axis. The saddle assembly 10 is the reference surface for the inclination gauge 11. Positioning of the inclination gauge is assisted with the presence of longitudinal lines 12 scribed on the saddle plate 13. Also on the saddle plate is a bubble vial 14 secured by bolts 43. The bubble vial indicates the amount of roll of the saddle plate on the pipe surface. The saddle assembly is secured in place with the use of two longitudinally spaced straps 15.

Figure 2:
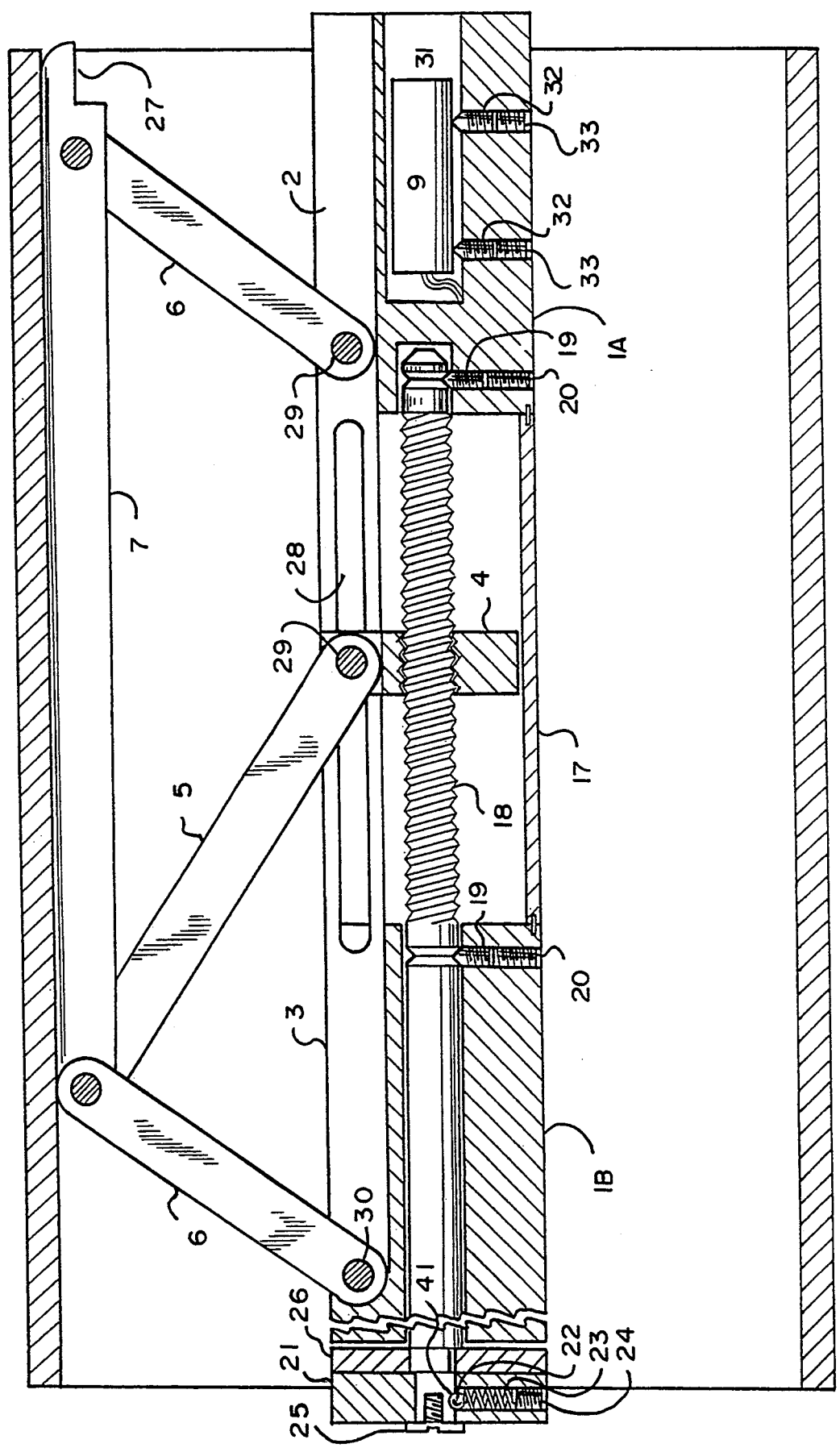
FIG. 2 is a cross sectional view taken on line 2—2 of FIG. 1 of the pipe axis laser guide in its expanded form in a section of pipe.

FIG. 2 shows a cross section of the pipe axis laser guide in a section of pipe. The lead screw 18 is centered in rear spider element 1b and partially in the front spider element 1a. The lead screw is retained in this position by a plurality of radially spaced cone point hex screws 19 backed up by additional hex screws 20. The cones extend into a grooved area 45 located in the lead screw. The adjustment of these hex screws allows rotation of the lead screw while preventing axial movement.

Mounted on the rear of the lead screw 18 is a knurled knob 21 which has ball 22 and spring 23 detent mechanism which is adjusted for tension by hex screw 24. While turning the knurled knob with the detent ball seated in a dimple 41 in the lead screw shaft, the lever spider advances or retracts until sufficient torque is exerted to disengage the detent disconnecting the knurled knob from the lead screw. A pan head screw 25 retains the knurled knob position over the shaft. A release knob 26 is keyed to the lead screw in order to expand or retract the unit after the knurled knob has disengaged. While the foregoing description has specifically described the detent mechanism, it will be appreciated that other available methods may be employed in order to prevent excessive torque causing distortion of the linkages mentioned above.

Figure 4:
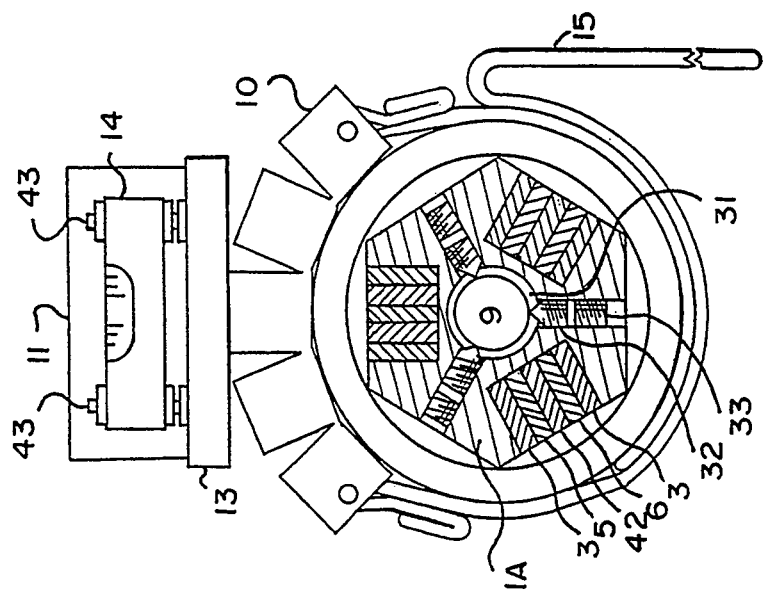
FIG. 4 is a cross sectional view of the pipe axis laser guide taken along line 4—4 of FIG. 1. This view is modified to exhibit its characteristics in a fully contracted position within a smaller section of pipe along with an end view of the mounted saddle and inclination gauge.

The spider lever meshes with the lead screw and is advanced or retracted positioning the lever link, radial links and the parallel link until contact is made with the inside diameter of the pipe. The parallel link is constructed with a notch 27 for placement on the outside circumference of the pipe when measuring outside diameters as noted in FIGS. 1 & 2. The axis link contains a slot 28 to allow access for joining the lever link to the spider lever with a shoulder screw 29. Another shoulder screw is used to secure the forward radial link and forward part of the axis link to the forward spider element. The rear radial link and the rear of the axis link is connected to the rear spider element with rolled pin 30. As seen in FIG. 4 spacers 42 are used to maintain proper alignment of links on the roll pin and shoulder screws as necessary.

The commercially available visible laser diode module such as the model VLM 2-10 RL manufactured by Applied Laser Systems is located in a bore 31 at the front end spider element and aligned to the housing axis with nine cone point hex screws 32 backed up by additional hex screws 33. While the foregoing description has specifically described the laser module, it will be appreciated that other available models may be employed for specific beam output characteristics and cost considerations.

Figure 3:
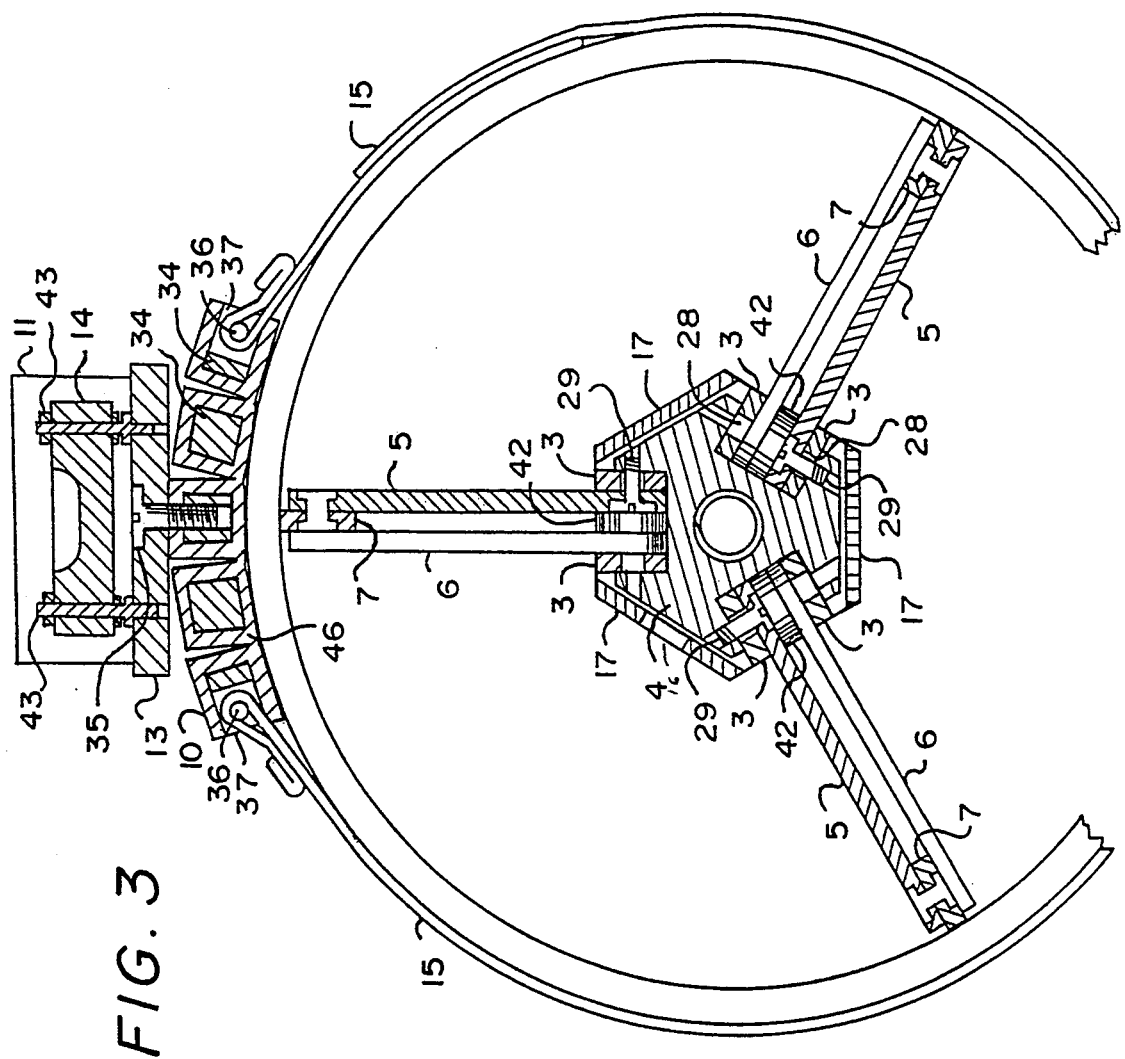
FIG. 3 is a cross sectional view of the pipe axis laser guide within a large section of pipe taken along line 3—3 of FIG. 1 including a cross sectional view of the saddle apparatus.

FIG. 3 shows the saddle assembly comprised of a number of rectangular struts 34 of rigid construction within a molded flexible base 46 made preferably of rubber. This construction allows the saddle to conform to various pipe circumferences while aligning the struts parallel to the pipe axis. The saddle plate is attached to the center strut by screws 35. The length of the struts and saddle plate may vary depending upon the type and style of inclination gauge used. The inclination gauge is not a permanent fixture and is applied in the field visibly aligned with the scribe marks when checking pipe inclination. The saddle plate may also be used as a reference surface for the fully retracted pipe axis laser guide when access to the pipe interior is obstructed and over the top methods of alignment are employed. The end struts possess pins 36 recessed in a biscuit like member 37 for retention of straps which may be characterized as of the hook and loop style. The bubble vial may be installed by conventional methods and calibrated to the saddle plate. The saddle assembly is positioned for an indication of zero roll prior to observing the inclination gauge reading.

Figure 6:
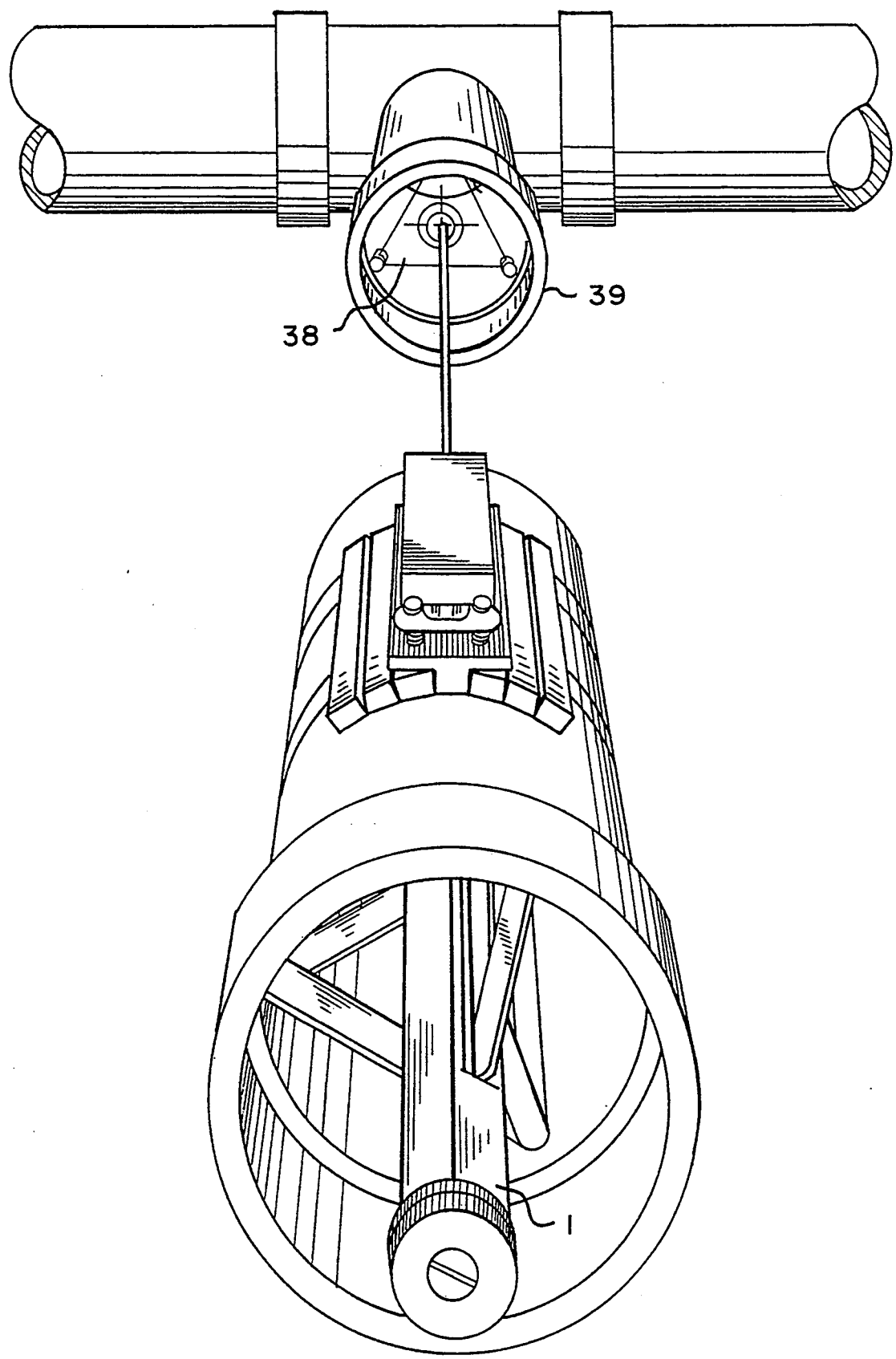
FIG. 6 is a perspective view showing the pipe axis laser installed in a section of pipe with the saddle and inclination gauge attached projecting the laser output towards a standard target assembly in a future connection.

After alignment of the laser beam with the axis of the pipe, the pipe is positioned towards a target assembly 38 installed in the distant pipe coupling 39 as seen in FIG. 6. The inclination gauge reading mounted on the properly aligned saddle plate is monitored for required grade and the elevation and horizontal position of either the coupling or the pipe is adjusted accordingly for alignment. At this point additional pipe connections can be installed by aligning their axes with the reference laser beam using the standard pipe target.

Figure 7:
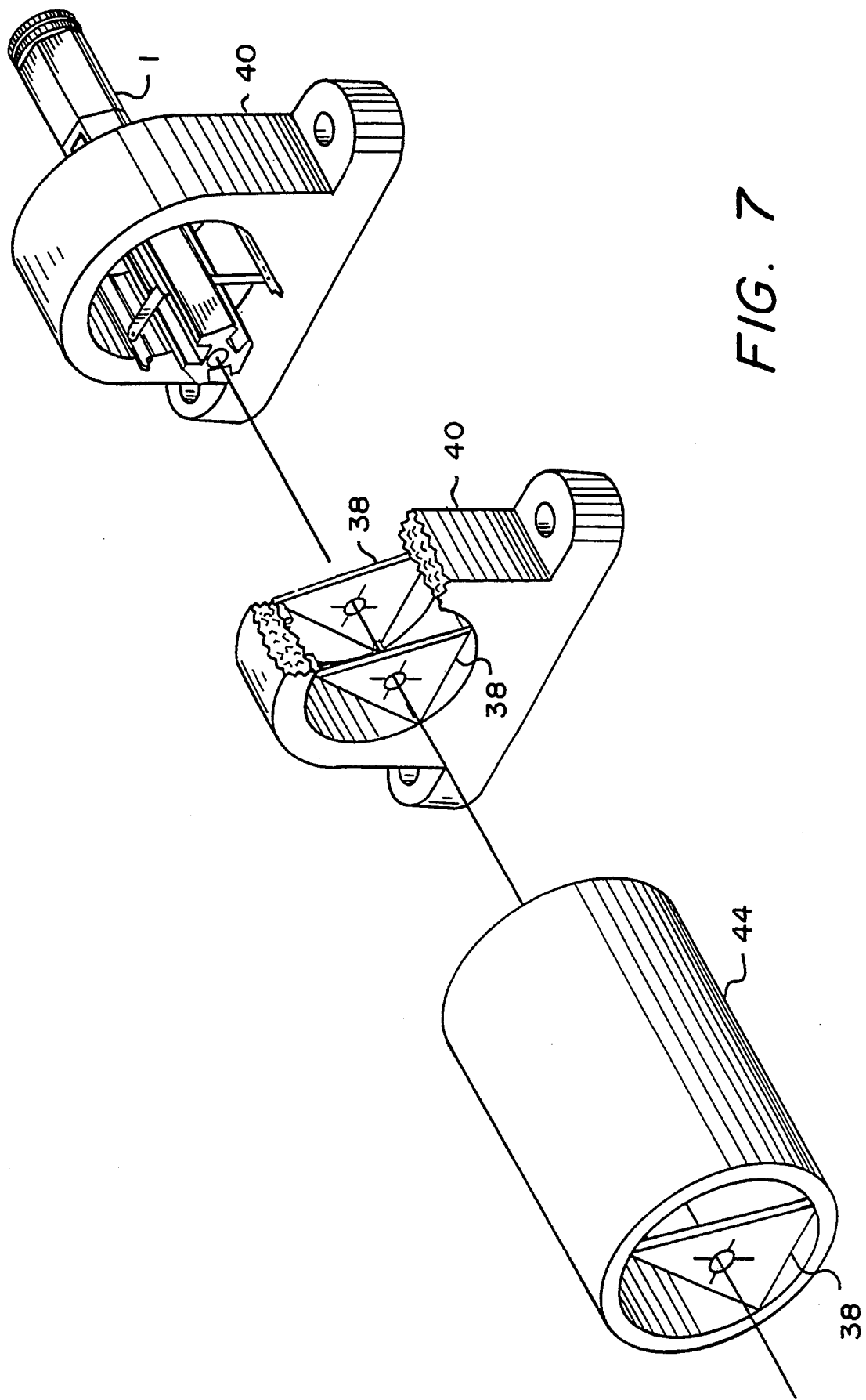
FIG. 7 is an isometric view of the pipe axis laser installed in a pillow block with its laser output projected through two target assemblies installed in a second pillow block for alignment of concentricity. A pipe section which may represent a motor shaft is also displayed.

FIG. 7 illustrates the versatility of the pipe axis laser guide by showing the apparatus installed in a pillow block 40 for a drive shaft bearing not shown. The position of the pillow block for the purposes of discussion may be installed on a large piece of driven machinery and a drive shaft and prime mover are to be aligned to this machinery. Independent pillow blocks are aligned to the driven machinery on all axes with the use of two target assemblies which allow the beam to pass through the target when centered thereon. A section of pipe 44 with targets 38 installed therein may be placed over the prime mover's drive shaft to aid in alignment of the independent prime mover in a like manner.

The subject matter of this invention has been described, but it should be obvious to those skilled in the art that many modifications, substitutions or variations of the invention are possible in light of the above teachings. It is therefore to be understood that within the scope of the appended claims the invention may be practiced otherwise than specifically described.

I claim:

1. A self centering pipe or pillow block axis laser guide for a pipe or pillow block having an inside diameter and an outside diameter, comprising: an expandible and contractible linkage mechanism (that is inserted) for insertion into the interior of said pipe, said linkage mechanism including three parallel links spaced 120 degrees apart that when expanded contact the interior of said pipe or pillow block and establish the center axis of said pipe or pillow block, said parallel links being connected to a pair of of radial links inclined in the same direction and an intermediate lever link located between said radial links, a housing having a front end and a rear end and comprising a front end spider element and a rear end spider element and a spider lever therebetween, said spider elements and said spider lever each having three channels having legs and spaced 120 degrees apart, a pair of axis links located adjacent each leg of each said channel and having narrow slots, said slots extending between said front end spider element and said rear end spider element, means fastening said lever link to said spider lever and extending through said slots of said axis links, said housing constituting a base centrally located with respect to said parallel links, a lead screw extending through said base, said spider lever having internal threads that mesh the threads of the lead screw, means at the rear end of the housing for rotating said screw and expanding or contracting the links therewith, and a laser beam module located in the front end of said housing for alignment with said center axis of the pipe or pillow block.

2. A self centering laser guide as in claim 1 wherein rotation of the screw clockwise will expand said linkage and rotation counterclockwise will contract said linkage and said means for rotating is a knurled knob.

3. A self centering laser guide as in claim 2 wherein said knob has a ball and spring detent mechanism mounted perpendicularly to the orientation of said knob with said ball seated in a dimple of said screw, wherein said knob expands or retracts said lever spider until sufficient torque has been exerted to disengage said detent whereby the knurled knob is disconnected from said lead screw thereby limiting further expansion or contraction.

4. A self centering laser guide as in claim 1 wherein said parallel links form a parallelogram with said radial links and said axis links and a saddle assembly comprised of a series of rectangular horizontally struts is mounted around the circumference of said pipe by two longitudinally spoaced straps said straps being adjusted until said struts are parallel to said pipe axis, as determined by said struts being tangent to said pipe circumference as viewed on each end of said pipe.

5. A self centering laser guide as in claim 4 wherein said horizontally aligned struts are located on a flexible base, said struts including a center strut on which is mounted a saddle plate, said saddle plate having longitudinally extending scribe marks oriented as said horizontal struts, said marks enabling alignment of an inclination gauge secured to said saddle plate with respect to the orientation of said scribe marks, a bubble vial mounted to the saddle plate perpendicular to the axis of said center strut, said bubble vial enabling positioning of said saddle plate above said pipe axis to eliminate roll error.

6. A self centering laser guide as in claim 1 wherein a pointer is fastened to said spider lever, said pointer facing downward adjacent a finely graduated scale mounted on one of two cover plates extending and in alignment with said front and rear spider elements to indicate the diameter of said pipe.

7. A self centering laser guide as in claim 6 wherein each of said parallel links has a (downwardly) front end and an inwardly facing L-shaped notch located at its (rear) front end, said notch contacting the outer diameter of said pipe when said laser guide is placed over said pipe and said parallel links contracted, said pointer indicating the outside diameter of the pipe at said notch contacting.

8. A self centering laser guide as in claim 1 wherein said lead screw is centered in said rear spider element and is retained therein by a plurality of radially spaced cone point hex screws backed up by additional hex screws, said cone points extending into a grooved area of said lead screw, said screws allowing rotation of said lead screw, while limiting axial movement, said laser module being located in a bore of said front end spider element, said laser module being aligned with said center axis of said pipe by a plurality of radially spaced cone point hex screws backed up by additional hex screws.

9. A self centering laser guide as in claim 1 wherein said guide is installed in a pillow block for a shaft bearing and additional pillow blocks are aligned on all axes with use of two target assemblies which allow the beam to pass through said target when centered thereon enabling alignment of said bearing.

10. A self centering laser guide as in claim 1 including a distant pipe coupling having a standard target assembly therein, said laser beam in said pipe being positioned toward said target assembly, enabling additional sections to be installed.

* * * * *